United States Patent [19]

Miyakawa et al.

[11] Patent Number: 5,202,934
[45] Date of Patent: Apr. 13, 1993

[54] METHOD OF AND APPARATUS FOR READING IMAGE

[75] Inventors: Tadashi Miyakawa; Shinji Itoh; Yukihisa Ozaki, all of Kanagawa, Japan

[73] Assignee: Fuji Photo Film Co., Ltd., Kanagawa, Japan

[21] Appl. No.: 713,205

[22] Filed: Jun. 11, 1991

[30] Foreign Application Priority Data

Jun. 22, 1990 [JP] Japan .................... 2-165320

[51] Int. Cl.⁵ .............................................. G06K 9/36
[52] U.S. Cl. ................... 382/41; 364/413.13; 382/49; 382/62
[58] Field of Search ................. 382/41, 49, 6, 58, 65, 382/62, 34; 364/523, 413.19, 413.13; 395/162, 101, 109

[56] References Cited

U.S. PATENT DOCUMENTS

| 4,464,789 | 8/1984 | Sternberg | 382/49 |
| 4,646,252 | 2/1987 | Terashita | 382/34 |
| 4,665,551 | 5/1987 | Sternberg et al. | 382/49 |
| 4,672,462 | 6/1987 | Yamada | 364/523 |
| 4,850,027 | 7/1989 | Kimmel | 382/49 |
| 4,951,201 | 8/1990 | Takeo et al. | 382/6 |

FOREIGN PATENT DOCUMENTS

63-257173  10/1988  Japan .
216167  1/1986  United Kingdom .

*Primary Examiner*—Joseph Mancuso
*Attorney, Agent, or Firm*—Sughrue, Mion, Zinn, Macpeak & Seas

[57] ABSTRACT

First image information recorded on a first subject copy is read for establishing processing conditions, and processing conditions are established based on the first image information which has been read. At the same time that the processing conditions are established based on the first image information, second image information recorded on a second subject copy is read for establishing processing conditions. The first image information recorded on the first subject copy is read again according to the established processing conditions to obtain output image information to be reproduced. Alternatively, processing conditions are established based on the second image information that has been read, at the same time that the first image information recorded on the first subject copy is read according to the established processing conditions.

6 Claims, 10 Drawing Sheets

METHOD OF AND APPARATUS FOR READING IMAGE

BACKGROUND OF THE INVENTION

1. Field of the Invention

The present invention relates to a method of and an apparatus for reading images while establishing certain processing conditions with respect to image information recorded on a number of subject copies to be read, and efficiently obtaining image information to be reproduced based on the established processing conditions.

2. Description of the Prior Art

Image scanning reading and reproducing systems are widely used in the printing and platemaking industries for electrically processing image information of originals or subject copies to produce original film plates with a view to simplifying the entire process and improving the quality of printed images.

The image scanning reading and reproducing systems have an image reading apparatus. In the image reading apparatus, an original or subject copy which is stored and positioned in a copy cassette is two-dimensionally scanned to read image information therefrom.

To produce an original film plate, a copy cassette is first fed to an image reader, and preliminarily scanned in the image reader in order to establish image processing conditions such as a magnification ratio and a gradation condition, for example. Based on the image information that is obtained by the preliminary scanning process, optimum image processing conditions are established. Then, the image information is scanned in a fine scanning process under the established image processing conditions.

However, the preliminary and fine scanning processes require a considerable period of time in which they are carried out. These processes are responsible for lowering the processing efficiency if original film plates are to be produced by reading image information from a number of subject copies to be read. Another problem arising out of the processing of a number of subject copies is difficulty in keeping abreast of the processing status of each subject copy.

SUMMARY OF THE INVENTION

It is a major object of the present invention to provide a method of and an apparatus for reading images while efficiently processing image information from a number of subject copies.

According to the present invention, there is provided a method of reading an image from a subject copy, comprising the steps of reading first image information recorded on a first subject copy for establishing processing conditions, establishing processing conditions based on the first image information which has been read, reading second image information recorded on a second subject copy for establishing processing conditions, at the same time that the processing conditions are established based on the first image information which has been read, and reading the first image information recorded on the first subject copy according to the established processing conditions to obtain output image information to be reproduced.

According to the present invention, there is also provided a method of reading an image from a subject copy, comprising the steps of reading first image information recorded on a first subject copy for establishing processing conditions, establishing processing conditions based on the first image information which has been read, reading second image information recorded on a second subject copy for establishing processing conditions, reading the first image information recorded on the first subject copy according to the established processing conditions to obtain output image information to be reproduced, and establishing processing conditions based on the second image information that has been read, at the same time that the first image information recorded on the first subject copy is read according to the established processing conditions to obtain the output image information.

According to the present invention, there is further provided an apparatus for reading image from a subject copy, comprising scanning reading means for reading image information recorded on a subject copy, setting means for establishing processing conditions with respect to the image information, control means for controlling the scanning reading means to read image information from the subject copy for establishing processing conditions, controlling the setting means to establish processing conditions based on the image information that has been read, and controlling the scanning reading means to read output image information to be reproduced, from the subject copy according to the established processing conditions, the control means comprising means for simultaneously controlling the scanning reading means to read the image information and the setting means to establish the processing conditions or simultaneously controlling the setting means to establish the processing conditions and the scanning reading means to read the output image information, and memory means for storing the processing conditions and the image information for establishing processing conditions.

The scanning reading means comprises an auxiliary scanning mechanism for feeding a copy cassette holding a plurality of subject copies in an auxiliary scanning direction, and an image reader for optically scanning the subject copies held by the copy cassette in a main scanning direction substantially normal to the auxiliary scanning direction, to obtain image information. The setting means comprises an input unit for entering the processing conditions, and a display unit for displaying the processing conditions which are entered through the input unit. The display unit comprises means for displaying a cassette display area which indicates processing status of a copy cassette holding subject copies, a copy display area which indicates a subject copy being processed in the copy cassette, and a setup display area which indicates processing status of the subject copies.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
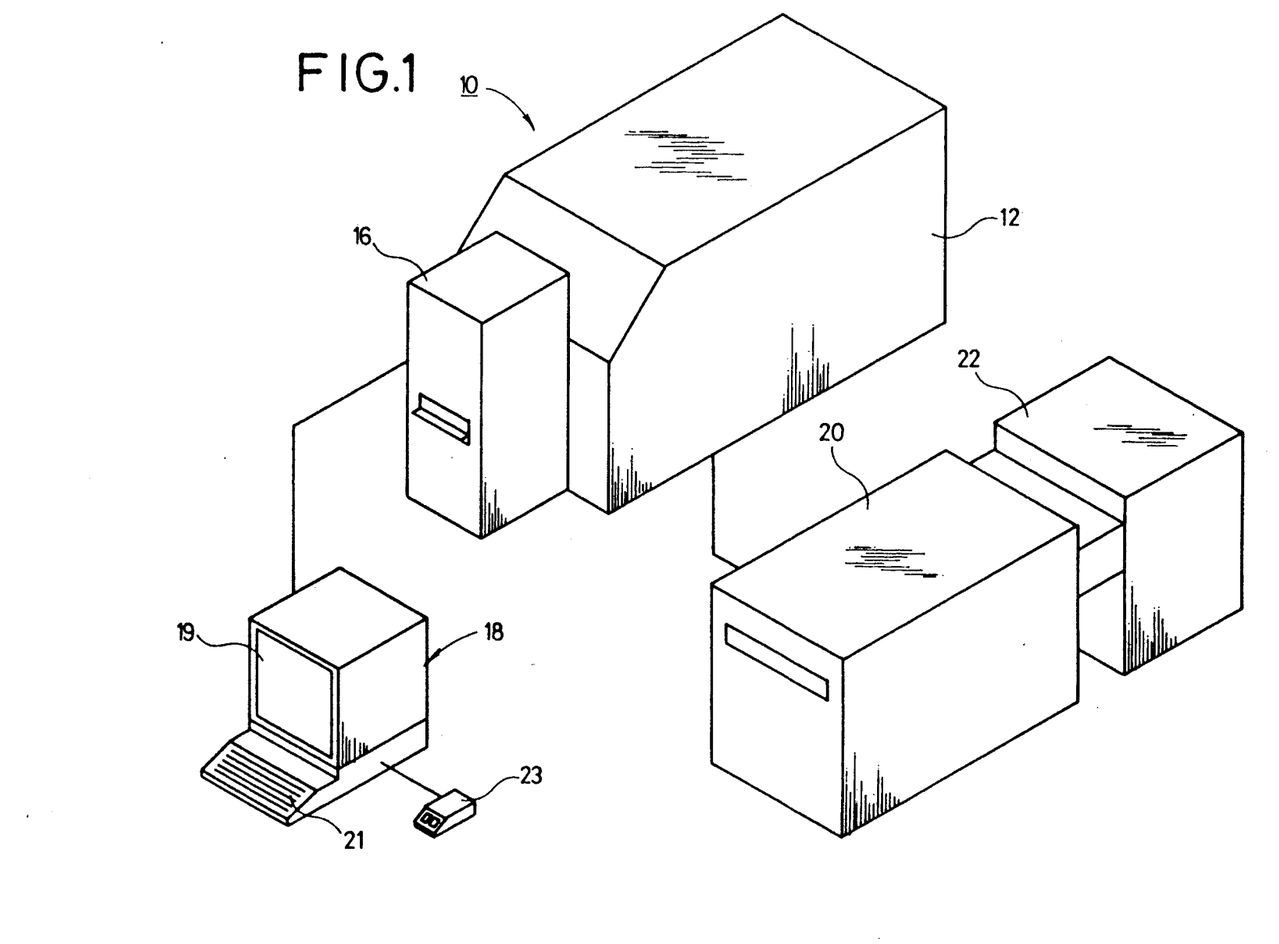
FIG. 1 is a perspective view of an image scanning reading and reproducing system which includes an image reading apparatus according to the present invention.

FIG. 1 shows an image scanning reading and reproducing system which generally includes an image reading apparatus 12, a copy cassette supply apparatus 16 for automatically supplying a copy cassette 14 (see FIG. 2) that holds subject copies S to the image reading apparatus 12, a control console 18 for controlling the image reading apparatus 12, an image output apparatus 20 for reproducing image information read by the image reading apparatus 12 on a photographic film, and an automatic processor 22 for producing an original film plate by developing the photographic film. The control console 18 comprises a CRT display 19 for displaying image information, a keyboard 21 for making key entries, and a mouse 23 for moving a cursor on the CRT display 19.

Figure 2:
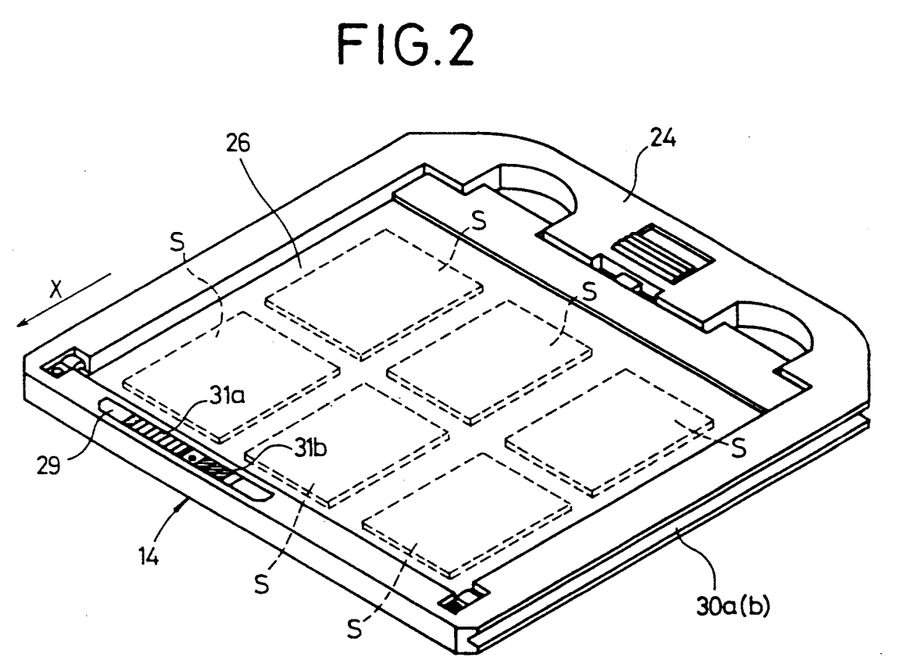
FIG. 2 is a perspective view of a copy cassette to be loaded into the image reading apparatus shown in FIG. 1.

As shown in FIG. 2, the copy cassette 14, which is to be supplied to the copy cassette supply apparatus 16 and the image reading apparatus 12, comprises a substantially square-shaped frame 24 and two support glass panels 26 surrounded by the frame 24, for holding a plurality of transmissive subject copies S between the glass panels 26. The copy cassette 14 has a pair of V-shaped grooves 30a, 30b defined in opposite lateral edges thereof and extending in the direction indicated by the arrow X, along which the copy cassette 14 is fed in the image reading apparatus 12. The frame 24 has a cassette identification 29 on an upper surface of its leading end in the feeding direction X, the cassette identification 29 serving to identify the subject copies S held in the copy cassette 14. The cassette identification 29 comprises a combination of a plurality of light-transmitting areas 31a and a plurality of light-blocking areas 31b depending on the copy cassette 14 and the type of the subject copies S held therein.

Figure 3:
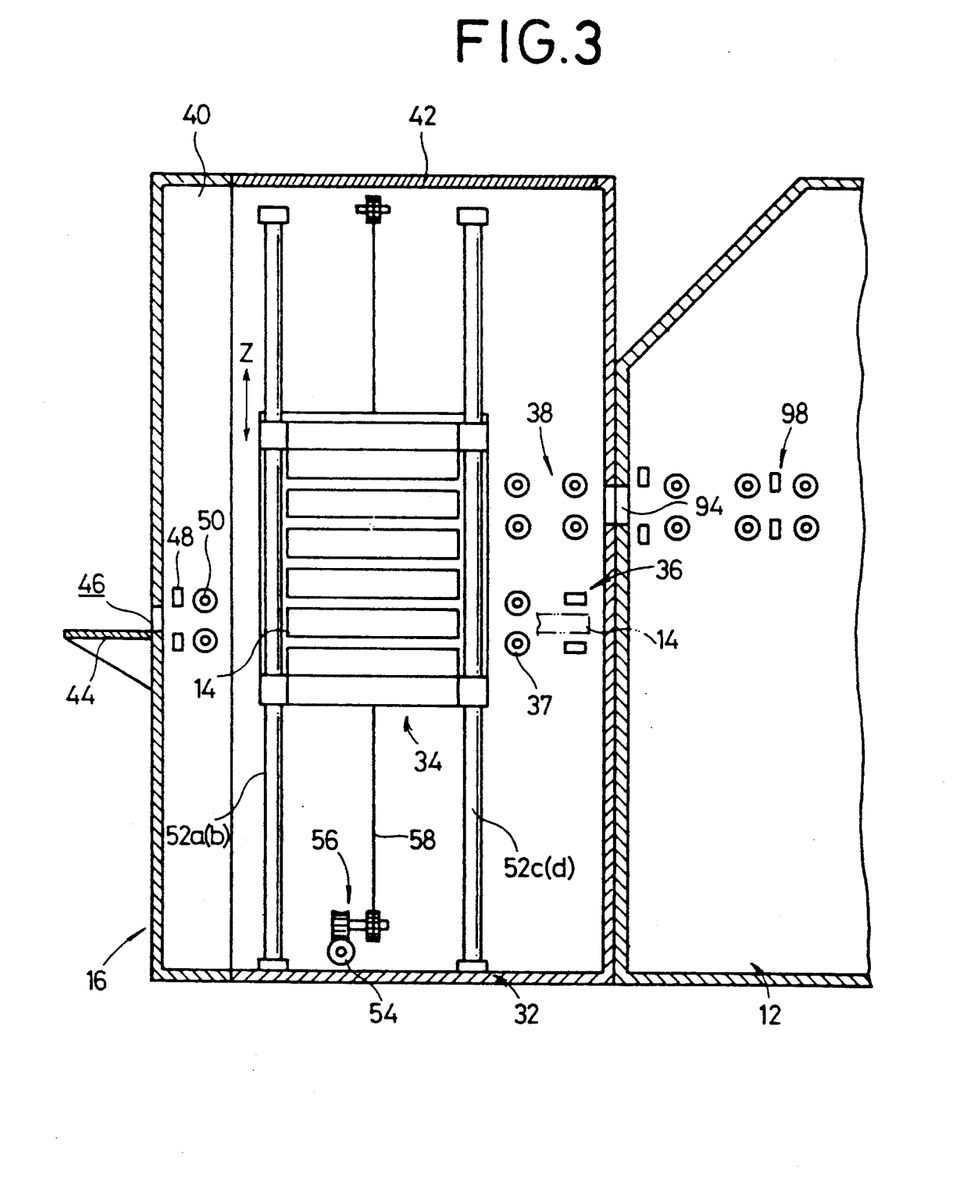
FIG. 3 is a fragmentary vertical cross-sectional view of a copy cassette supply apparatus in the system shown in FIG. 1.

FIG. 3 shows the cassette supply apparatus 16. The cassette supply apparatus 16 is surrounded by a casing 32, and comprises a cassette holder 34 for storing copy cassettes 14, a cassette identifier 36 for identifying the copy cassettes 14, and a cassette supply device 38 for supplying a copy cassette 14 from the cassette holder 34 to the image reading apparatus 12 that is coupled to the cassette supply apparatus 16.

The casing 32 has a first lid 40 which can be opened and closed on a front side of the casing 32, and a second lid 42 which can be opened and closed on an upper side of the casing 32. The first lid 40 has a cassette insertion tray 44 mounted on its outer surface, and a cassette insertion slot 46 defined in its wall immediately above the cassette insertion tray 44. Within the first lid 40, there are disposed a copy cassette detector 48 such as a photointerrupter which is positioned immediately behind the cassette insertion slot 46, for detecting a copy cassette 14 as it is inserted through the cassette insertion slot 46, and a pair of feed rollers 50 immediately behind the copy cassette detector 48 for feeding an inserted copy cassette 14 into the cassette supply apparatus 16.

The cassette identifier 36 comprises a set of light-emitting elements and light-detecting elements. The cassette identifier 36 reads data from the cassette identification 29 of a copy cassette 14 which has been fed by feed rollers 37, and identifies the copy cassette 14 and the type of subject copies held therein based on the read data.

The cassette holder 34 comprises a cage supported on four vertical guide bars 52a, 52b, 52c, 52d disposed in the casing 32. The cage is vertically movable in the directions indicated by the arrow Z by a worm gear 56 coupled to a motor 54 and a chain 54 trained around the worm gear 56.

Figure 4:
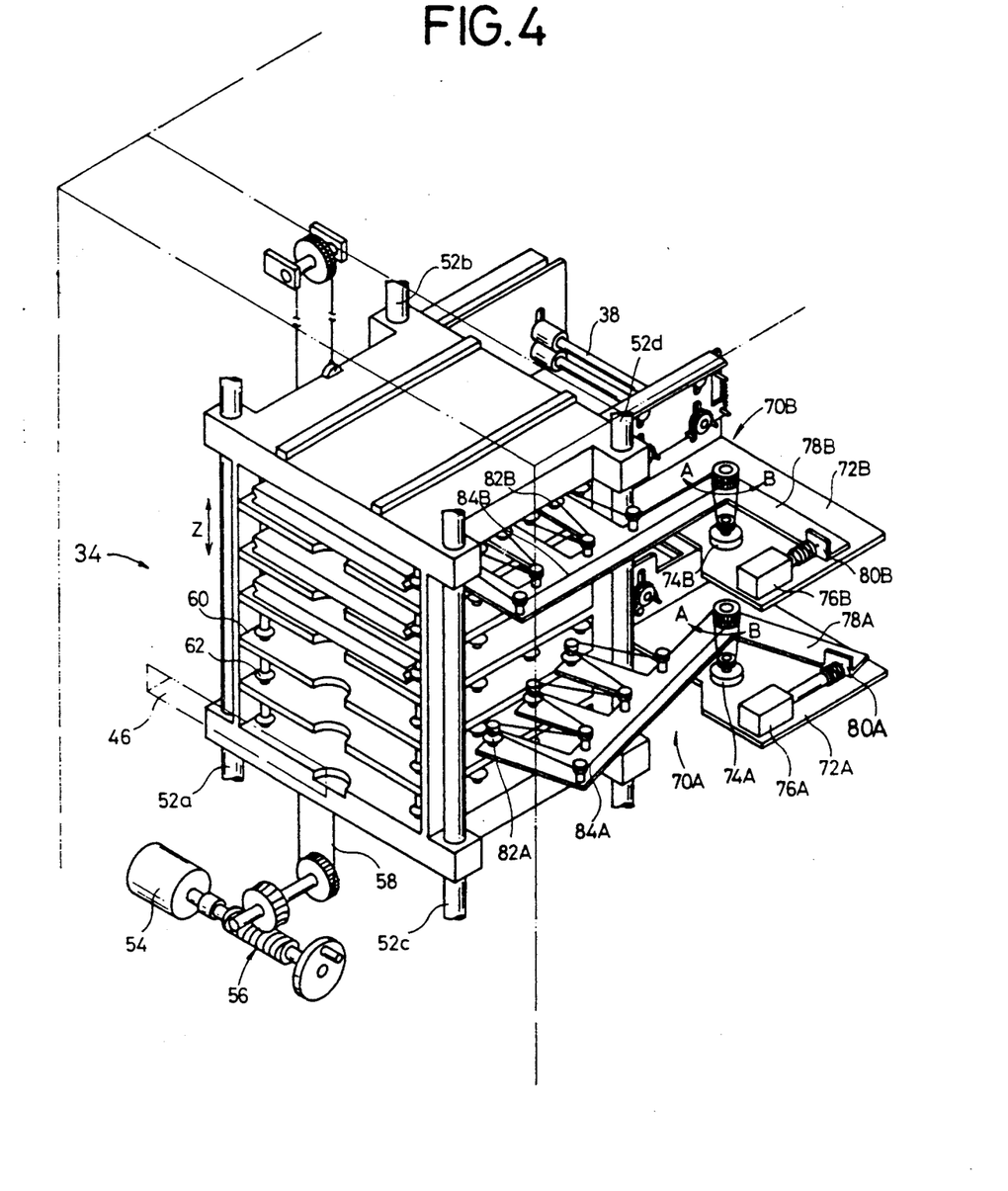
FIG. 4 is a perspective view of the copy cassette supply apparatus shown in FIG. 3.

As shown in FIG. 4, the cassette holder 34 has a plurality of vertically spaced plates 60 defining therebetween bins for loading copy cassettes 14 therein, and a plurality of spaced guide rollers 62 disposed between the plates 60 in each pair for engaging in the grooves 30a, 30b of the copy cassettes 14

A cassette feed mechanism 70A is disposed on one side of the cassette holder 34 in horizontal alignment with the feed rollers 50 in the first lid 40. The cassette feed mechanism 70A has a horizontal support plate 72A, a motor 74A fixedly mounted on the support plate 72A, a solenoid 76A fixedly mounted on the support plate 72A, and a drive plate 78A angularly movably supported on the support plate 72A. The drive plate 78A is a substantially L shape having a bent portion pivotally supported on the support plate 72A and coupled at a vertical joint 80A on the end to the solenoid 76A. The other end portion of the drive plate 78A is of a comb-toothed shape and supports guide rollers 82A on the respective tips of the teeth. The guide rollers 82A are rotatable by the motor 74A through a wire 84A trained therearound. When the solenoid 76A is energized, the drive plate 78A is angularly moved to displace the guide rollers 82A into positions between the guide rollers 62 between the plates 60 of the cassette holder 34.

Another cassette feed mechanism 70B is disposed above the cassette feed mechanism 70A, on the same side of the cassette holder 34 as the cassette feed mechanism 70A in horizontal alignment with the cassette supply device 38. The cassette feed mechanism 70B is identical in structure to the cassette feed mechanism 70A, and will not be described in detail below. Those parts of the cassette feed mechanism 70B which are identical to those of the cassette feed mechanism 70A are denoted by identical reference numerals with a suffix B.

Figure 5:
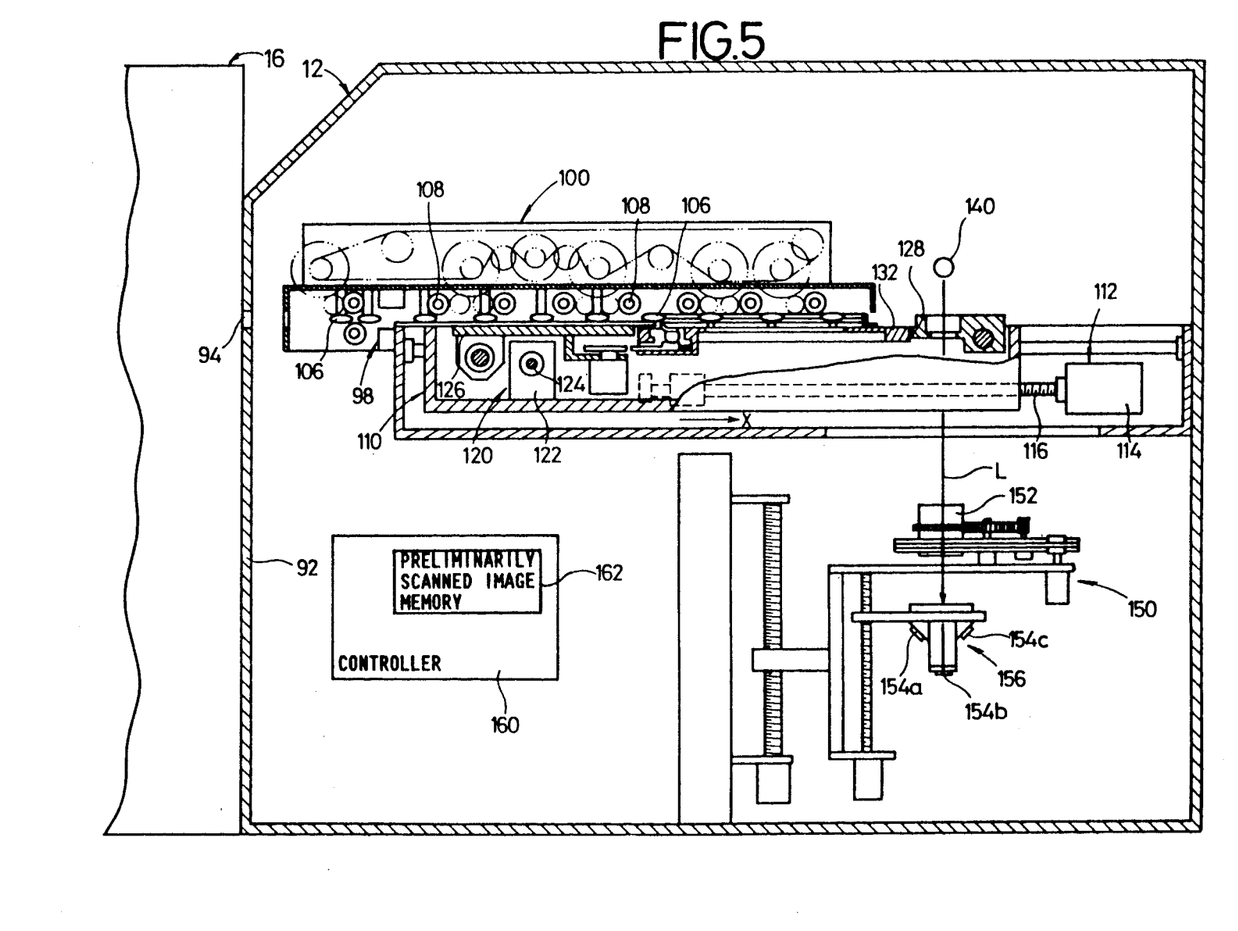
FIG. 5 is a vertical cross-sectional view of the image reading apparatus shown in FIG. 1.

As shown in FIG. 5, the image reading apparatus 12 has a cassette insertion slot 94 communicating with the copy cassette supply apparatus 16, and includes an identifying mechanism 98 disposed near the cassette insertion slot 94 for identifying an inserted copy cassette 14 and the type of subject copies S held therein. The identifying mechanism 98 is structurally identical to the cassette identifier 36 in the copy cassette supply apparatus 16.

The image reading apparatus 12 has a feed mechanism 100 with one end thereof disposed near the identifying mechanism 98. The other end of the feed mechanism 100 extends to a position above a turntable (described later on). The feed mechanism 12 has a plurality of guide rollers 106 for engaging in the V-shaped grooves 30a, 30b of an inserted copy cassette 14 in point-to-point contact. The feed mechanism 100 also has drivable feed rollers 108 for rolling contact with surfaces of the frame 24 of the copy cassette 14, so that the copy cassette 14 can be fed by the feed rollers 108. Below the feed mechanism 100, there is disposed a copy table 110 that is movable back and forth in an auxiliary scanning direction (indicated by the arrow X) by an auxiliary scanning mechanism 112. The auxiliary scanning mechanism 112 includes a rotative drive source 114 such as a motor which is coupled to the copy table 110 by a ball screw 116. When the rotative drive source 114 is energized, the copy table 110 is displaced in the auxiliary scanning direction indicated by the arrow X through the ball screw 116.

The copy table 110 supports a trimming mechanism 120 for displacing the copy cassette 14 back and forth in a trimming direction perpendicular to the auxiliary scanning direction indicated by the arrow X. The trimming mechanism 120 has a rotative drive source 122 such as a motor mounted on the copy table 110 and coupled to one end of a ball screw 124. The ball screw 124 extends in the trimming direction and is threaded through a nut (not shown) attached to a trimming table 126. The other end of the ball screw 124 is supported on the copy table 10.

The trimming table 126 has an opening 128 defined therein. In the opening 128, there is disposed a turntable 132 which is rotatable by a rotating mechanism (not shown) to turn a copy cassette 14 on the turntable 132 through a predetermined angle.

A light source 140 serving as a transmissive illuminating mechanism is disposed in the casing 92 and extends in a main scanning direction substantially normal to the auxiliary scanning direction indicated by the arrow X. An image reader 150 for photoelectrically reading illuminating light L emitted by the light source 140 is disposed below the light source 140. The image reader 150 comprises a focusing lens 152 and a photoelectric transducer 156 composed of a plurality of CCDs 154a, 154b, 154c. The image reader 150 photoelectrically reads color image information borne by a subject copy S as pieces of image information which correspond to R, G, B colors.

The image reading apparatus 12 is controlled in its operation by a controller 160 disposed in the casing 92. The controller 160 includes a preliminarily scanned image memory 162 for storing image information read from a subject copy S by the image reader 150, and also for storing processing conditions for the image information.

A procedure for making an original film plate using the image scanning reading and reproducing system 10 will be described below.

Figure 6:
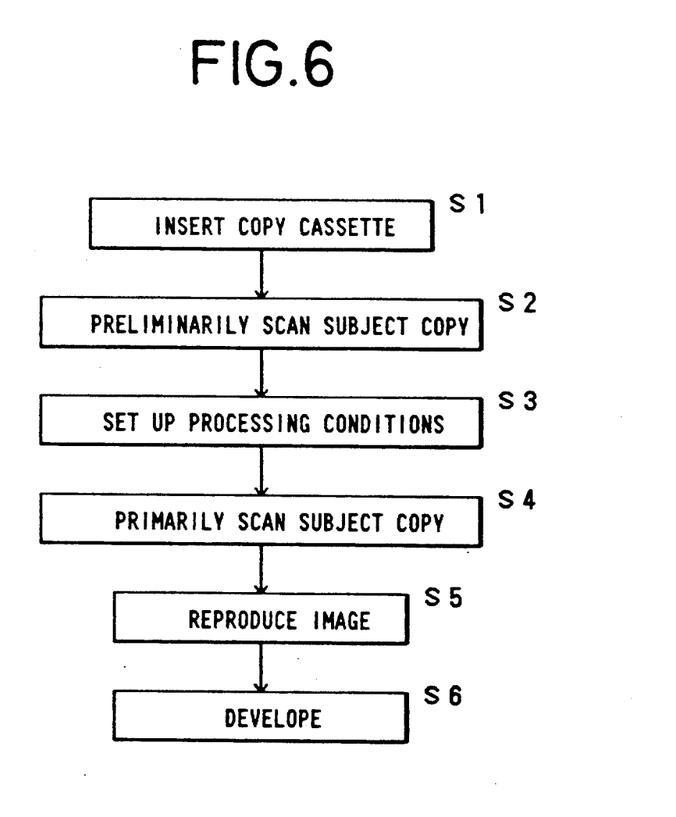
FIG. 6 is a flowchart of an operation sequence of the image scanning reading and reproducing system shown in FIG. 1.

Production of an original film plate based on image information read from a single subject copy S will be described below with reference to FIG. 6.

A copy cassette 14 holding a desired subject copy S to be read is inserted into the copy cassette supply apparatus 16 through the cassette insertion slot 46 in a step S1. When the copy cassette 14 is inserted into the copy cassette supply apparatus 16, it is detected by the copy cassette detector 48. Based on a detected signal from the copy cassette detector 48, the feed rollers 50 are rotated to load the inserted copy cassette 14 into one of the bins of the cassette holder 34. The loaded copy cassette 14 is held in the bin by the guide rollers 62 which engage the grooves 30a, 30b of the copy cassette 14 (see FIG. 4).

When the copy cassette 14 is thus fed into the cassette holder 34, the cassette feed mechanism 70A is actuated. More specifically, the solenoid 76A is energized to cause the joint 80A to turn the drive plate 78A in the direction indicated by the arrow A, thereby displacing the guide rollers 82A on the tooth tips of the drive plate 78A into the bin until the guide rollers 82A engage in one of the grooves 30a, 30b of the copy cassette 14. Then, the motor 74A is energized to cause the wire 84A to rotate the guide rollers 82A for moving the copy cassette 14 until its leading end reaches the cassette identifier 36 through the feed rollers 37 (see FIG. 3).

The cassette identifier 36 then reads the data represented by the cassette identification 29 on the leading end of the copy cassette 14, thus identifying the copy cassette 14 and the type of the subject copy S.

After the identification data have been read, the copy cassette 14 is returned back to the cassette holder 34. The motor 54 is thereafter energized to cause the worm gear 56 and the chain 58 to move the cassette holder 34 upwardly in the direction indicated by the arrow Z (FIGS. 3 and 4). While the cassette holder 34 is moving, the cassette feed mechanism 70A is retracted out of the cassette holder 34.

When the copy cassette 14 loaded in the cassette holder 34 reaches a vertical position aligned with the cassette feed mechanism 70B, the cassette feed mechanism 70B is displaced into the cassette holder 34, and feeds the copy cassette 14 from the cassette holder 34 to the cassette supply device 38. Then, the copy cassette 14 is introduced into the image reading apparatus 12 through the cassette insertion slot 94 by the cassette supply device 38.

In the image reading apparatus 12, the copy cassette 14 is identified by the identifying mechanism 98. Then, while being held by the guide rollers 106 engaging in the V-shaped grooves 30a, 30b, the copy cassette 14 is fed onto the turntable 132 by the feed rollers 108.

After the copy cassette 14 is transferred onto the turntable 132, the copy cassette 14 is fed with the copy table 110 in the auxiliary scanning direction indicated by the arrow X (FIG. 5) by the auxiliary scanning mechanism 112. During the auxiliary scanning movement, the subject copy S held in the copy cassette 14 is preliminarily scanned by the image reader 150 to produce image information for establishing processing conditions in a step S2 (FIG. 6).

More specifically, illuminating light L emitted by the light source 140 is transmitted through the subject copy S held in the copy cassette 14, and passes through the focusing lens 152 to the CCDs 154a, 154b, 154c of the photoelectric transducer 156. The CCDs 154a, 154b, 154c convert the light L having passed through the subject copy S into an electric signal which is representative of the image information of the subject copy S. The electric signal is processed by the controller 160, then stored as a preliminarily scanned image in the preliminarily scanned image memory 162 and displayed on the CRT display 19 of the control console 18.

The operator now establishes or sets up processing conditions based on the preliminarily scanned image displayed on the CRT display 19 in a step S3.

The processing conditions referred to above are used as conditions to make an original film, and may be classified into scanning conditions and image processing conditions. The scanning conditions include conditions to determine a trimming range in which the subject copy S is to be read, a magnification ratio with which the subject copy S is to be read, an angle through which the subject copy S is to be turned when it is to be read, the type of a halftone dot pattern with which the image of the subject copy S is to be processed, and a screen ruling, to select color plates (YMCK) for the original film plate, and to determine whether borders or edges are to be established for the original film plate. The image processing conditions include conditions to determine the densities of highlights and shadows in the original film plate, a halftone dot percentage, gradations, color correction, sharpness, and background color removal. The image processing conditions may be either manually established by the operator through the keyboard 21, or automatically established for predetermined optimum values based on the preliminarily scanned image.

After the subject copy S is preliminarily scanned in the step S2 and the processing conditions are set up for the subject copy S in the step S3, the subject copy S is scanned in a fine scanning mode by the image reader 150 to produce image information (primarily scanned image) which will be reproduced.

The primarily scanned image is transferred to the image output apparatus 20 in which it is converted into an optical signal represented by a laser beam or the like. Using the optical signal, the image is reproduced on a photographic film in a step S5. The photographic film is then sent to the automatic processor 22 in which it is developed into a desired original film plate in a step S6.

Figure 7A:
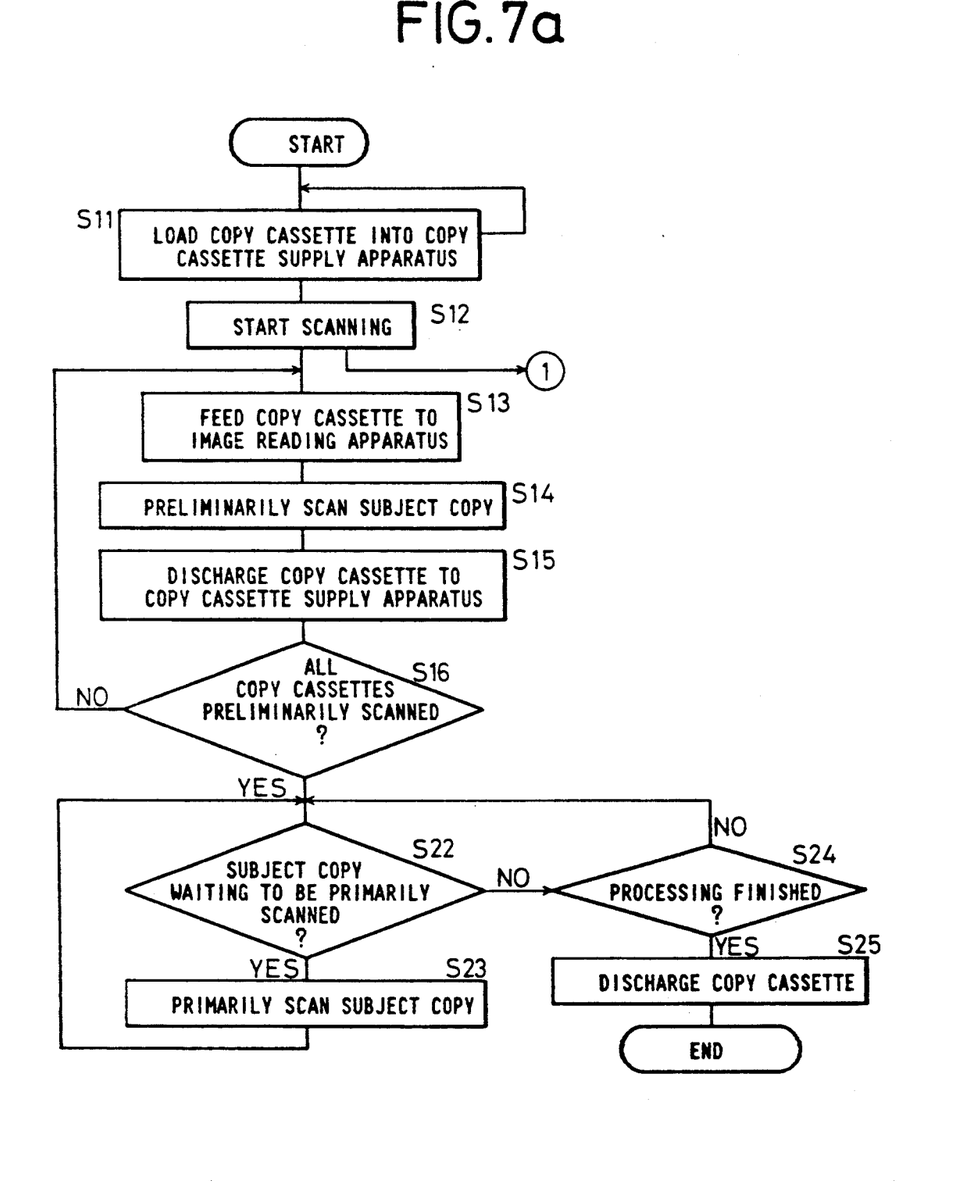
FIGS. 7a and 7b are a flowchart of a parallel processing operation in the copy cassette supply apparatus and the image reading apparatus shown in FIG. 1.
Figure 7B:
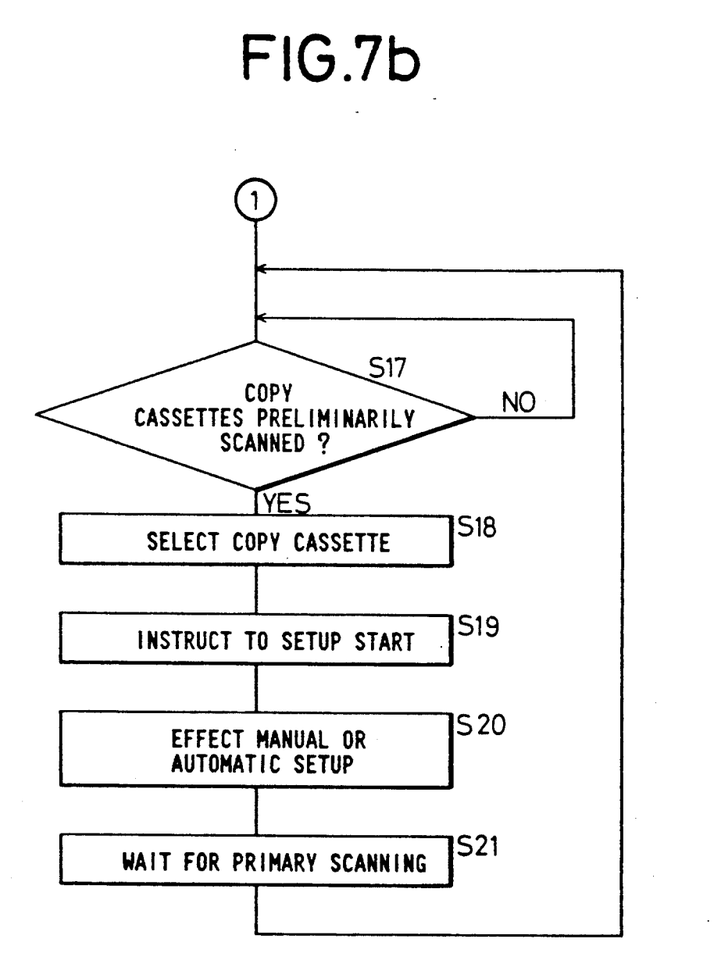

The image of the single subject copy S is basically processed in the manner described above. Now, operation of the image reading apparatus 12 to process a plurality of subject copies S and/or a plurality of copy cassettes 14 will be described below with reference to FIGS. 7a and 7b.

A plurality of copy cassettes 14 each holding a plurality of subject copies S are loaded into the respective bins between the plates 60 of the cassette holder 34 in the copy cassette supply apparatus 16 in a step S11. The cassette identifier 36 reads the numbers of the copy cassettes 14 and the size data, etc., of the subject copies S held in the copy cassettes 14 from the cassette identifications 29 of the copy cassettes 14, and transfers the numbers and the data to the controller 160 in the image reading apparatus 12.

Figure 8A:
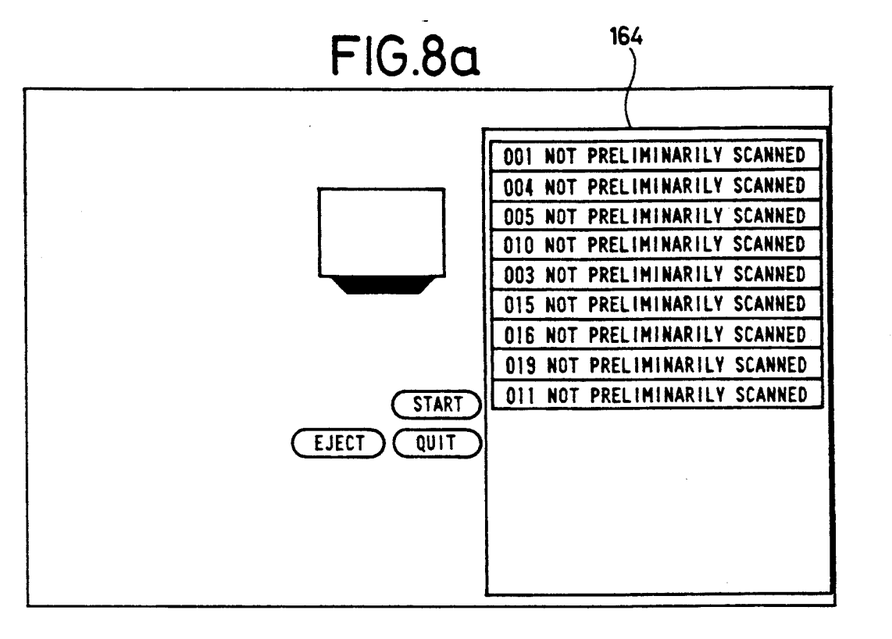
FIGS. 8a through 8d are views illustrative of information displayed on a CRT display which is connected to the image reading apparatus shown in FIG. 1.

The controller 160 displays the numbers and the data on the CRT display 19. At this time, as shown in FIG. 8a, the CRT display 19 displays in a cassette display area 164 the information as to which copy cassettes 14 are loaded in the bins of the cassette holder 34. The cassette display area 164 also displays, in addition to the positions and numbers of the copy cassettes 14, messages such as, for example, "NOT PRELIMINARILY SCANNED" indicating that the copy cassette 14 is not preliminarily scanned, "BEING PRELIMINARILY SCANNED" indicating that the copy cassette 14 is being preliminarily scanned, "CONDITIONS CAN BE SET UP" indicating that the copy cassette 14 has been preliminarily scanned and processing conditions can be set up, "WAITING FOR PRIMARY SCANNING" indicating that the copy cassette 14 has been preliminarily scanned and processing conditions have been set up, "BEING PRIMARILY SCANNED" indicating that the copy cassette 14 is being primarily scanned, and "PRIMARY SCANNING COMPLETED" indicating that the fine scanning of the copy cassette 14 is completed (see FIGS. 8a through 8d).

Then, the operator uses the mouse 23 and clicks on "START" (FIG. 8a) displayed on the CRT display 19, instructing a scan start in a stp S12. In response to the instruction, the controller 160 feeds a copy cassette 14 indicated by the message "NOT PRELIMINARILY SCANNED" from the copy cassette supply apparatus 16 into the image reading apparatus 12 in a step S13, and controls the image reader 150 to preliminarily scan the copy cassette 14 in a step S14.

After being preliminarily scanned, the copy cassette 14 is discharged from the image reading apparatus 12 into the copy cassette supply apparatus 16, and then a next copy cassette 14 is fed from the copy cassette supply apparatus 16 into the image reading apparatus 12 in a step S15. The copy cassettes 14 are successively fed, preliminarily scanned, and discharged until all the copy cassettes 14 in the copy cassette supply apparatus 16 are displayed with the message "CONDITIONS CAN BE SET UP" in a step S16.

The operator may insert a copy cassette 14 into the copy cassette supply apparatus 16 after a scan start is instructed. In this case, the cassette detector 48 in the copy cassette supply apparatus 16 detects the insertion of such an inserted copy cassette 14, and transmits the detected signal to the controller 160 in the image reading apparatus 12. If a copy cassette 14 is being preliminarily scanned, at this time, then the controller 160 controls the inserted copy cassette 14 to be preliminarily scanned after all copy cassettes 14 that are waiting to be preliminarily scanned. Alternatively, if a copy cassette 14 is being primarily scanned, at this time, the controller 160 controls the inserted copy cassette 14 to be preliminarily scanned immediately after the primary scanning of the copy cassette 14 is completed.

Figure 8B:
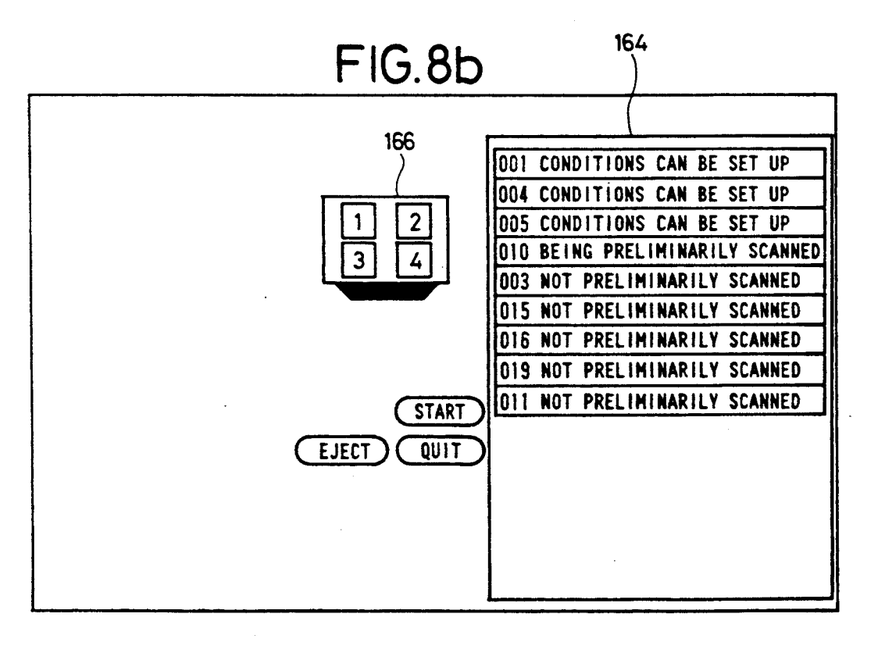

Processing conditions with respect to a subject copy S which has been preliminarily scanned are established or set up as follows:

For a processing condition setup, the information shown in FIG. 8b may be displayed on the CRT display 19. In the cassette display area 164, those copy cassettes 14 which have been preliminarily scanned are displayed with the message "CONDITIONS CAN BE SET UP" in a step S17. The operator then selects one of those copy cassettes 14 using the mouse 23 or the keyboard 21 in a step S18. The CRT display 19 now displays in a copy display area 166 images of subject copies S held in the copy cassette 14 and their numbers. The operator then selects a desired one of the displayed subject copies S using the mouse 23 or the keyboard 21, instructing a setup start in a step S19. In response to the setup start instruction, the CRT display 19 displays information for a setup (not shown).

The operator establishes scanning conditions to produce a desired original film plate using the mouse 23 or the keyboard 21, and also establishes image processing conditions, if necessary, in a step S20. The image processing conditions may automatically be established on the basis of predetermined data. When the setup of processing conditions is completed with respect to all the subject copies S held in the copy cassette 14, the copy cassette 14 now waits for primary scanning in a step S21.

The image reading apparatus 12 can perform the preliminary scanning process from the steps S13 to S16 and the setup process from the steps S17 to S21 at the same time after the scan start in the step S12. Specifically, since the preliminarily scanned image of a subject copy S held in a preliminarily scanned copy cassette 14 has already been stored in the preliminarily scanned image memory 162, scanning conditions and image processing conditions can be set up on the basis of the stored preliminarily scanned image. The parallel operation for preliminarily scanning a copy cassette 14 and setting up processing conditions for a subject copy S held in a preliminarily scanned copy cassette 14 is effective to shorten the entire processing time, and is highly advantageous when a large number of subject copies S are to be processed.

The copy cassette 14 for which the processing condition setup has been completed is returned to the copy cassette supply apparatus 16. Thereafter, a primary scanning process is started in response to an instruction from the operator through the mouse 23 or the keyboard 21. At this time, the CRT display 19 displays the information shown in FIG. 8c. The displayed information includes a setup display area 168 which displays icons indicating whether the subject copies S that are displayed in the copy display area 166 which are held in the copy cassette 14, to be primarily scanned, displayed in the cassette display area 164, wait to be primarily scanned. The subject copy S being processed is highlighted or otherwise indicated in the copy display area 166.

Figure 8C:
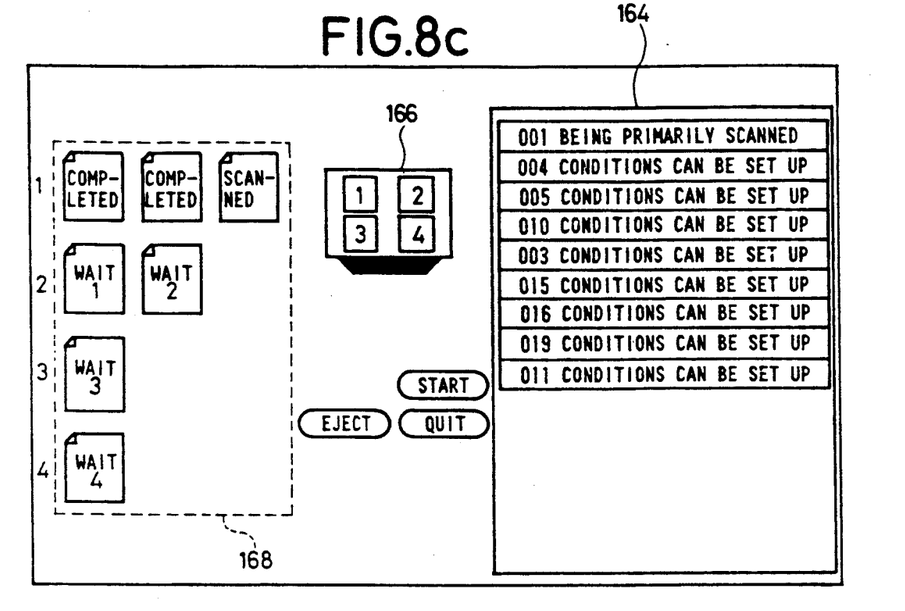

In the setup display area 168, the message "WAIT" indicates that the subject copy is waiting to be primarily scanned, the message "SCAN" indicates that the subject copy is being primarily scanned, and the message "END" indicates that the primary scan is ended. The numerals in the respective icons represent the sequence in which the subject copies will be primarily scanned.

In response to a primary scan instruction from the operator, the image reading apparatus 12 primarily scans the subject copies S successively which wait to be primarily scanned in steps S22, S23. Any copy cassette 14 which has been primarily scanned is discharged from the image reading apparatus 12 by the copy cassette supply apparatus 16 in steps S24, S25 according to an instruction from the operator.

In the image reading apparatus 12, while a subject copy S is being primarily scanned in the steps S22 through S25, processing conditions can be set up for another subject copy S for which a processing condition setup has not yet been completed, in the steps S17 through S21. The parallel operation shortens the entire processing time of the image reading apparatus 12.

Figure 8D:
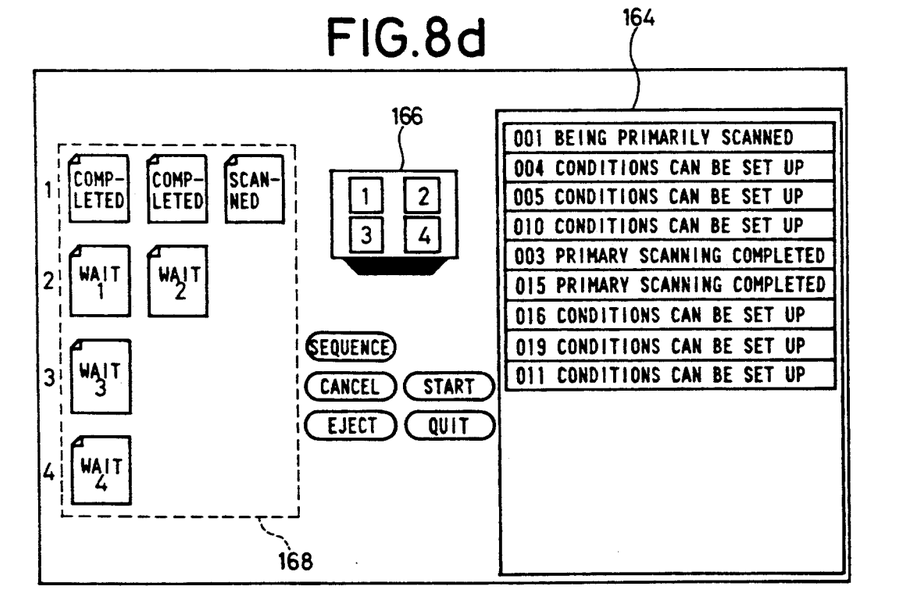

Processing of a selected copy cassette 14 can be brought to an end by selecting "QUIT" displayed on the CRT display 19 as shown in FIG. 8d, using the mouse 23 or the keyboard 21. When the processing is thus brought to an end, any information relative to the copy cassette 14 and the subject copies S held therein is erased from the screen of the CRT display 19. If the copy cassette 14 which is instructed to quit is being preliminarily or primarily scanned, or if there is a subject copy S waiting to be primarily scanned, the preliminary scanning process, the primary scanning process, or the process of waiting for primary scanning is canceled and comes to an end.

When "CANCEL" displayed on the CRT display 19 is selected, a subject copy S waiting to be primarily scanned or being primarily scanned is canceled. When the canceling instruction is applied, an icon corresponding to the subject copy S that is canceled is erased.

If an icon corresponding to a desired subject copy S to be primarily scanned at first is selected when a primary scan start is instructed, the selected subject copy S starts to be primarily scanned.

With the present invention, as described above, when output image information to be reproduced is to be obtained from the images of a plurality of subject copies, an image reading process for establishing processing conditions and a process for establishing processing conditions with respect to image information that has been read can be performed simultaneously or parallel with each other, and also a process of reading output image information based on the establishing processing conditions and a process of establishing the processing conditions can be performed simultaneously or parallel with each other. Accordingly, the images of a number of subject copies can be processed highly efficiently.

Although a certain preferred embodiment has been shown and described, it should be understood that many changes and modifications may be made therein without departing from the scope of the appended claims.

What is claimed is:

1. A method of reading an image from a subject copy, comprising the steps of:
   providing an image reading apparatus for preliminarily scanning image information recorded on a first subject copy for determining a first set of image processing conditions;
   establishing said first set of image processing conditions in said image reading apparatus;
   causing said image reading apparatus to preliminarily scan image information recorded on a second subject copy for determining a second set of image processing conditions, at the same time that said first set of image processing conditions are being established in said image reading apparatus; and
   reading said image information recorded on said first subject copy according to said first set of image processing conditions to obtain output image information to be reproduced.

2. A method of reading an image from a subject copy, comprising the steps of:
   providing an image reading apparatus for preliminarily scanning image information recorded on a first subject copy for determining a first set of image processing conditions;
   establishing said first set of image processing conditions in said image reading apparatus;
   causing said image reading apparatus to preliminarily scan image information recorded on a second subject copy for determining a second set of image processing conditions;
   reading said image information recorded on said first subject copy according to said first set of image processing conditions to obtain output image information to be reproduced; and
   establishing said second set of image processing conditions in said image reading apparatus, at the same time that said image information recorded on said first subject copy is read according to said first set of image processing conditions to obtain said output image information.

3. An apparatus for reading an image from a subject copy, comprising:
   scanning reading means for reading image information recorded on a subject copy;

setting means for establishing image processing conditions with respect to said image information;

control means for controlling said scanning reading means to read said image information from said subject copy for determining said image processing conditions, controlling said setting means to establish said image processing conditions based on said image information that has been read, and controlling said scanning reading means to read output image information to be reproduced from said subject copy according to said image processing conditions, said control means comprising means for simultaneously controlling said scanning reading means to read said image information and said setting means to establish said image processing conditions or simultaneously controlling said setting means to establish said image processing conditions and said scanning reading means to read said output image information; and memory means for storing said image processing conditions, and said image information for establishing said image processing conditions.

4. An apparatus according to claim 3, wherein said scanning reading means comprises an auxiliary scanning mechanism for feeding a copy cassette holding a plurality of subject copies in an auxiliary scanning direction, and an image reader for optically scanning said subject copies held by said copy cassette in a main scanning direction substantially normal to said auxiliary scanning direction, to obtain said image information.

5. An apparatus according to claim 3, wherein said setting means comprises an input unit for entering said image processing conditions, and a display unit for displaying said image processing conditions which are entered through said input unit.

6. An apparatus according to claim 5, wherein said display unit comprises means for displaying a cassette display area which indicates processing status of a copy cassette holding said subject copies, a copy display area which indicates a subject copy being processed in said copy cassette, and a setup display area which indicates processing status of said subject copies.

* * * * *